(12) United States Patent
Lee et al.

(10) Patent No.: US 7,610,658 B2
(45) Date of Patent: Nov. 3, 2009

(54) HINGE STRUCTURE

(75) Inventors: Haung Wen Lee, Sinjhuang (TW); Chia Jung Chiang, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 358 days.

(21) Appl. No.: 11/602,866

(22) Filed: Nov. 21, 2006

(65) Prior Publication Data
US 2008/0034549 A1    Feb. 14, 2008

(30) Foreign Application Priority Data
Aug. 9, 2006    (TW) .............................. 95214040 U

(51) Int. Cl.
*E05D 3/10*    (2006.01)
(52) U.S. Cl. ...................................................... 16/367
(58) Field of Classification Search ................... 16/367, 16/337, 338, 339, 340; 361/679.27; 248/921; 455/575.3
See application file for complete search history.

(56) References Cited
U.S. PATENT DOCUMENTS

| | | | | |
|---|---|---|---|---|
| 2,736,027 A * | 2/1956 | Parmelee | ......................... | 2/8.1 |
| 6,378,830 B1 * | 4/2002 | Lu | ........................... | 248/278.1 |
| 7,024,729 B2 * | 4/2006 | Chang et al. | .................. | 16/367 |
| 7,133,280 B2 * | 11/2006 | Love | .......................... | 361/681 |
| 7,146,195 B2 * | 12/2006 | Sudo et al. | .............. | 455/575.1 |
| 7,158,816 B1 * | 1/2007 | Mizuta et al. | ............ | 455/575.3 |
| 2008/0034546 A1 * | 2/2008 | Hsu | ............................. | 16/367 |
| 2008/0034547 A1 * | 2/2008 | Hsu | ............................. | 16/367 |
| 2008/0034550 A1 * | 2/2008 | Chang et al. | .................. | 16/367 |
| 2008/0098568 A1 * | 5/2008 | Hsu | ............................. | 16/367 |
| 2008/0109996 A1 * | 5/2008 | Hsu et al. | ...................... | 16/367 |
| 2008/0204985 A1 * | 8/2008 | Bae et al. | .................... | 361/681 |

* cited by examiner

*Primary Examiner*—Victor Batson
*Assistant Examiner*—Matthew Sullivan
(74) *Attorney, Agent, or Firm*—Guice Patents PLLC

(57) ABSTRACT

A hinge structure includes a bracket, which has a horizontal top panel and a vertical side panel, a first pivot set inserted through the side panel of the bracket and rotatably coupled to a support and having two elongated ribs protruded from one end of the pivot shaft and a guide groove defined between the elongated ribs, and a second pivot set inserted through the horizontal top panel of the bracket and rotatably coupled to a mounting frame and having a two flat cut faces at two sides of the head of the pivot shaft thereof for stopping against the elongated rids of the pivot shaft of the first pivot set such that the second pivot set is locked when the first pivot set is not turned to the predetermined angle, or unlocked for rotation when the first pivot set is turned to the predetermined angle.

12 Claims, 5 Drawing Sheets

FIG. 4

HINGE STRUCTURE

BACKGROUND OF THE INVENTION

1. Field of the Invention

The present invention relates to hinges and more particularly, to a hinge structure, which is rotatable in a horizontal direction, and rotatable in a vertical direction only after it is rotated in the horizontal direction to a predetermined angle, for example, 90° angle.

2. Description of the Related Art

Cover lift type consumer electronic products, such as mobile computer, electronic dictionary, mobile video player, cover lift mobile phone, etc., generally comprises a base member, a cover, and a hinge coupled between the base member and the cover for allowing the cover to be opened from or closed on the base member. The hinge is one of the factors that determine the quality of the product. In addition to the function of providing a satisfactory of retaining effect for positive positioning, a good hinge must accurately limit the turning angle.

In recent years, advanced 3C electronic products have been continuously created. The conventional single hinge design to have the cover be turnable relative to the base member in a particular direction cannot satisfy the demand. Therefore, two pivot type hinge structures are developed for enabling the cover to be rotated relative to the base member when opened from the base member. Taiwan patent 573901 discloses a similar design for use in an electronic device between the screen and the base member. According to this design, the hinge structure comprises a fixed holder member affixed to the base member and a rotary holder member pivotally coupled between the fixed holder member and the screen. Thus, the screen is rotatable in latitude direction within a limited, and the two legs of the rotary holder member are turnable in longitude direction within a limited angle. By means of one simple hinge structure, this design provides the user with an added function in use.

The aforesaid prior art design allows rotation of the rotary holder member relative to the fixed holder member in latitude direction. However, there is no constraint means between the fixed holder member and the rotary holder member. If the screen is opened from the base member to a position beyond a specific angle, for example, 90°, and rotated relative to the base member, the end edge of the screen will hit the end edge of the base member, causing damage. Therefore, certain 3C electronic products must have a constraint means in their hinge structure to eliminate the aforesaid problem.

SUMMARY OF THE INVENTION

The present invention has been accomplished under the circumstances in view. It is therefore the main object of the present invention to provide a hinge structure, which is rotatable in a horizontal direction, and rotatable in a vertical direction only after it is rotated in the horizontal direction to a predetermined angle, for example, 90° angle.

To achieve this and other objects and according to one aspect of the present invention, the hinge structure comprises a bracket, a first pivot set, and a second pivot set. The bracket has a horizontal top panel, and a side panel perpendicularly downwardly extending from one end of the horizontal top panel. The first pivot set comprises a pivot shaft horizontally and rotatably inserted through the side panel of the bracket and rotatably coupled to a support. The pivot shaft of the first pivot set has two elongated ribs protruded from one end thereof, and a guide groove defined between the two elongated ribs. The second pivot set comprises a pivot shaft vertically and rotatably inserted through the horizontal top panel of the bracket and rotatably coupled to a mounting frame. The pivot shaft of the second pivot set has a head at a bottom end thereof. The head of the pivot shaft of the second pivot set has two flat cut faces disposed at two opposite sides. When the first pivot set is rotated relative to the bracket to a zero angle position, the two elongated ribs of the pivot shaft of the first pivot set are stopped at one flat cut face of the head of the pivot shaft of the second pivot set to lock the second pivot set, prohibiting rotation of the second pivot set. When the first pivot set is rotated relative to the bracket to a predetermined angle, the head of the pivot shaft of the second pivot set is received in the guide groove between the two elongated ribs of the pivot shaft of the first pivot set to unlock the second pivot set, allowing rotation of the second pivot set.

According to another aspect of the present invention, the horizontal top panel of the bracket has a vertical axle hole, and the side panel of the bracket has a pivot hole. Further, the pivot shaft of the first pivot set is inserted through at least one spring member and the pivot hole of the side panel of the bracket and then pivotally fastened a through hole of the support. The pivot shaft of the second pivot set is inserted through at least one spring member and the axle hole of the horizontal top panel of the bracket and then pivotally fastened to a through hole of the mounting frame.

According to still another aspect of the present invention, the hinge structure further comprises a third pivot set pivoted to the bracket. The third pivot set comprises a pivot shaft, a ring, and a L-shaped support. The pivot shaft of the third pivot set is inserted through a pivot hole on a second side panel of the bracket and the ring, and pivotally fastened to a through hole on the L-shaped support.

According to still another aspect of the present invention, the pivot shaft of the second pivot set has a collar and a neck connected between the collar and the head. The collar has two flat cut faces disposed at two opposite sides for stopping the two elongated ribs of the pivot shaft of the first pivot set.

According to still another aspect of the present invention, the horizontal top panel of the bracket has two horizontal grooves formed on the bottom wall thereof and respectively extending from the axle hole at two sides and aligned in line. The second pivot set further comprises a locating member mounted on the pivot shaft of the second pivot set below the horizontal top panel of the bracket. The locating member has two protrusions adapted to engage the horizontal grooves of the horizontal top panel of the bracket.

According to still another aspect of the present invention, the horizontal top panel of the bracket has two stop rods upwardly protruded from the top wall thereof around the axle hole and adapted to limit the angle of rotation of the second pivot set relative to the bracket. The second pivot set further comprises a stop member and a follower member respectively mounted on the pivot shaft of the second pivot set between the bracket and the mounting frame and rotatable with the pivot shaft of the second pivot set. The stop member has a sector stop flange. The follower member has two downward push rods. When the follower member is rotated with the pivot shaft of the second pivot set, one of the push rods is forced against the sector stop flange to move the stop member to a position where the sector stop flange is stopped stop rod of the bracket.

According to still another aspect of the present invention, the side panel of the bracket has two slots. The first pivot set further comprises a supplementary plate member mounted on the pivot shaft of the first pivot set. The supplementary plate member has two raised portions corresponding to the slots of the side panel of the bracket. The raised portions of the supplementary plate member are respectively engaged into the slots of the side panel of the bracket when the first pivot set is rotated to the predetermined angle.

According to still another aspect of the present invention, the side panel of the bracket has a stop rod. The first pivot set further comprises a limiter mounted on the pivot shaft of the first pivot set between the side panel of the bracket and the support. The limiter has two protrusions spaced from each other at an angle and alternatively stoppable against the stop rod of the side panel of the bracket to limit the angle of rotation of the first pivot set relative to the bracket.

According to still another aspect of the present invention, the supplementary plate member has a recess adapted to accommodate a limiter that is mounted on the pivot shaft of the first pivot set and adapted to limit the angle of rotation of the first pivot set relative to the bracket.

According to still another aspect of the present invention, the first pivot set further comprises a cam wheel set. The cam wheel set comprises a movable member mounted on and rotatable with the pivot shaft of the first pivot set, and a fixed member affixed to the side panel of the bracket and disposed in contact with the movable member by means of a concave portion and a convex portion therebetween.

BRIEF DESCRIPTION OF THE DRAWINGS

FIG. 4 is a sectional view of the hinge structure according to the present invention.

DETAILED DESCRIPTION OF THE PREFERRED EMBODIMENT

Figure 1:
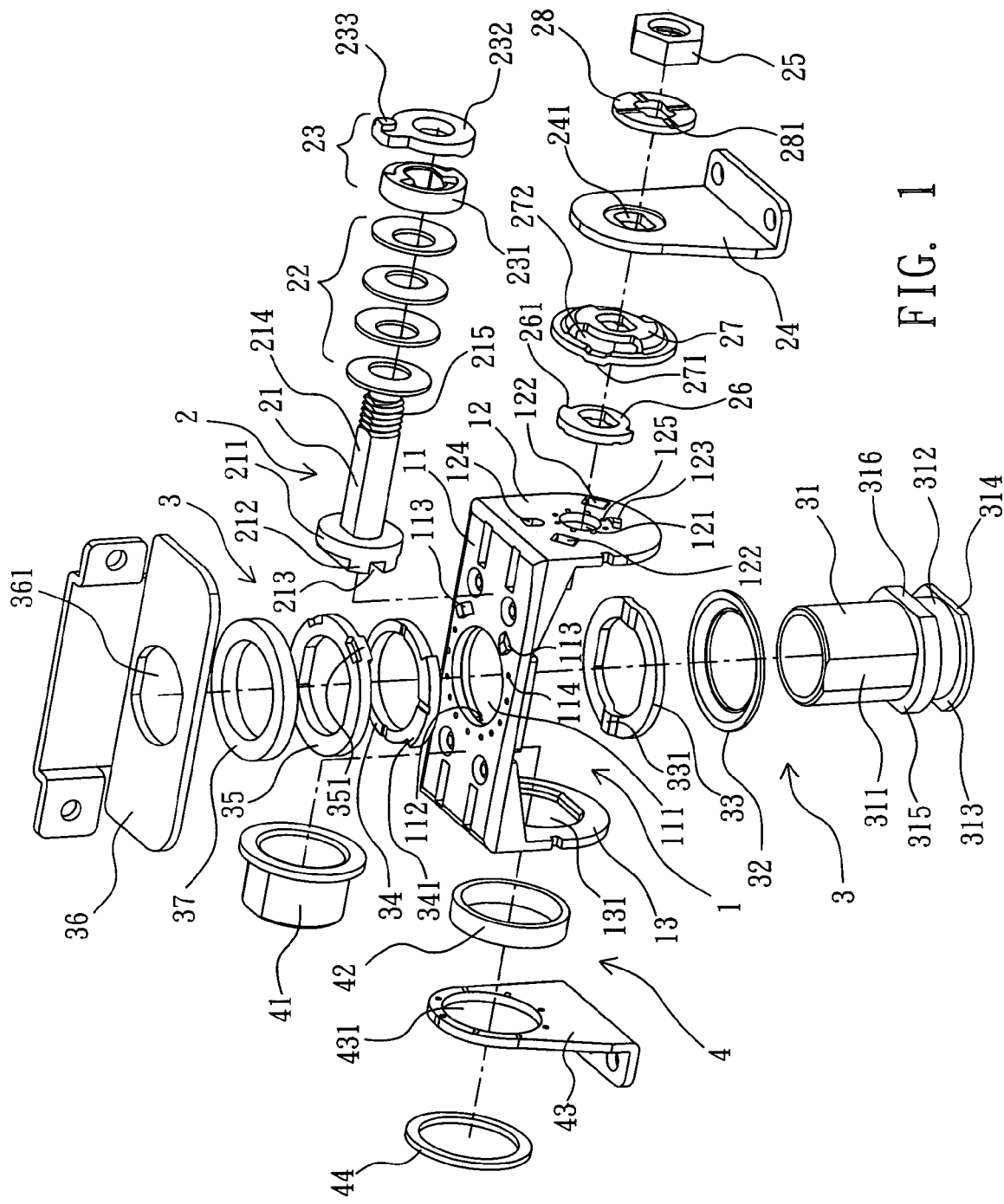
FIG. 1 is an exploded view of a hinge structure according to the present invention.
Figure 2:
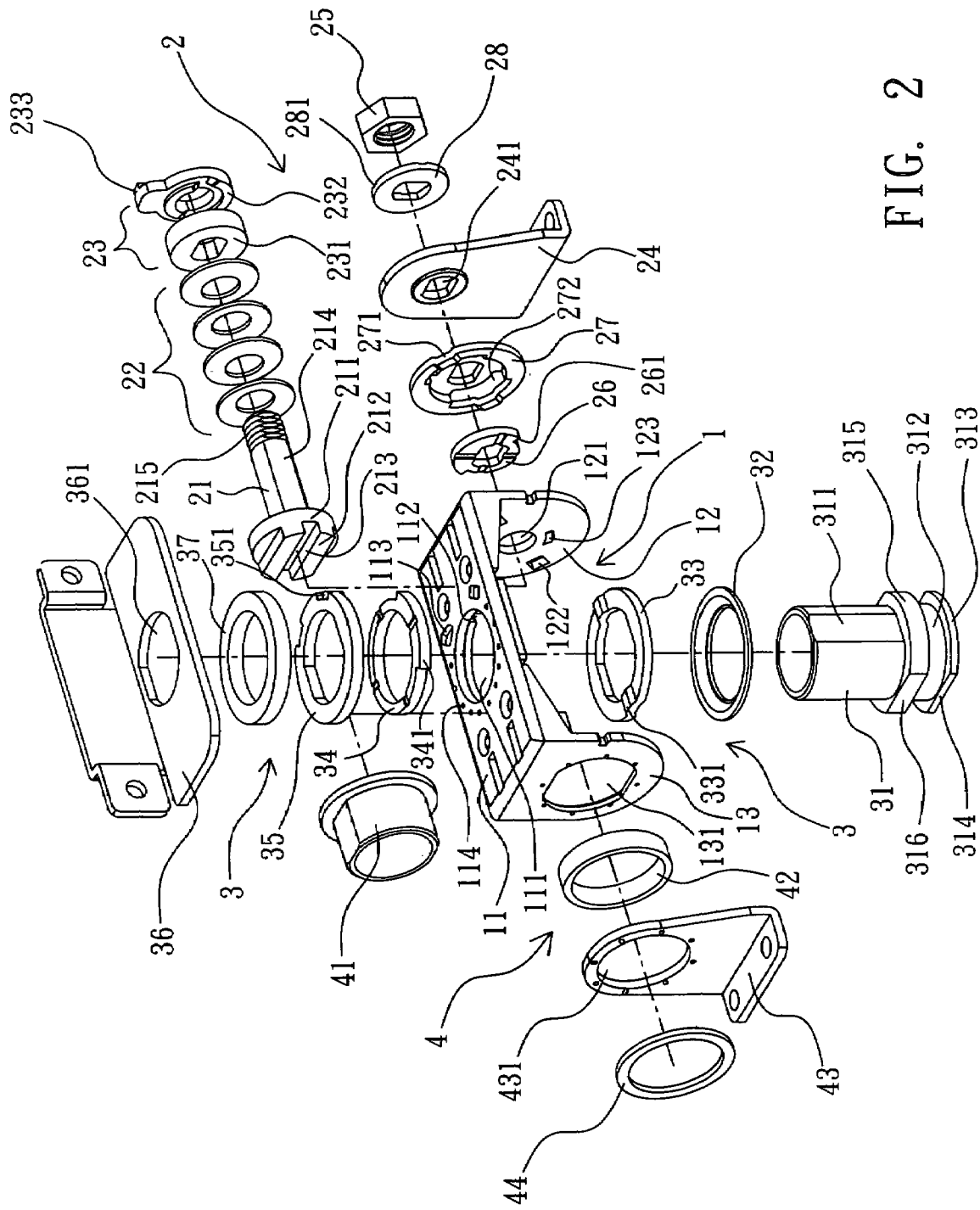
FIG. 2 corresponds to FIG. 1 when viewed from another angle.

Referring to FIGS. 1 and 2, a hinge structure in accordance with the present invention is shown comprised of a bracket 1, a first pivot set 2, and a second pivot set 3. A third pivot set 4 may be provided and pivotally mounted in the bracket 1.

The bracket 1 is directly stamped out of sheet metal. According to this embodiment, the bracket 1 is a ∏-shaped metal member having a horizontal top panel 11 and two vertical side panels 12 and 13 respectively downwardly extending from the two distal ends of the horizontal top panel 11 for supporting the first pivot set 2, the second pivot set 3 and the third pivot set 4. Alternatively, the bracket 1 can be a L-shaped metal member having only one side panel 12 perpendicularly downwardly extending from one end of the horizontal top panel 11 for supporting the first pivot set 2 and the second pivot set 3. The horizontal top panel 11 has an axle hole 111 vertically extending through the top and bottom walls thereof at the center for the passing of the hollow pivot shaft 31 of the second pivot set 3, two horizontal grooves 112 formed on the bottom wall and respectively outwardly extending from the axle hole 111 at two sides and aligned in line, two stop rods 113 upwardly protruded from the top wall around the axle hole 111 at locations subject to the designed angle of rotation, and a plurality of oil holes 114 spaced around the axle hole 111. The side panel 12 has a pivot hole 121 for the passing of the pivot shaft 21 of the first pivot set 2, two slots 122 at two sides relative to the through hole 121, a stop rod 123, a locating hole 124, and a plurality of oil holes 125.

The first pivot set 2 is pivotally mounted in the side panel 12 of the bracket 1, having a pivot shaft 21 inserted in proper order through a plurality of spring members 22, a cam wheel set 23, the pivot hole 121 of the side panel 12 and a through hole 241 of a support 24, and then fastened up with a fastening member 25, for example, a screw nut. The pivot shaft 21 has a head 211 at one end. The head 21 has two elongated ribs 212 and a guide groove 213 defined between the two elongated ribs 212. Further, the pivot shaft 21 has at least one flat surface 214 on the peripheral wall thereof and a coupling portion 215, for example, outer thread at the free end (the end remote from the head). The spring members 22 can be coil springs, corrugated spring plates, or spring washers. The cam wheel set 23 is of the known art, comprising a movable member 231 and a fixed member 232 that work against each other by means of a concave portion and a convex portion therebetween. The cam wheel set 23 matches with compressing or expanding action of the spring members 22, providing the bracket 1 with a self-locking function, i.e., enabling the bracket 1 to be locked to the support 24. The fixed member 232 has a locating block 233 engaged into the locating hole 124 of the side panel 12 of the bracket 1.

Further, the bracket 1 is rotatable by an external biasing force. In order to limit the angle of rotation of the bracket 1, a limiter 26 is mounted on the pivot shaft 21 between the side panel 12 and the support 24. The limiter 26 has two protrusions 261. When rotating the bracket 1 in one of two reversed directions, the stop rod 123 will be stopped against one protrusion 261 of the limiter 26 to limit the angle of rotation. Further, in order to give an indication when rotation of the second pivot set 3 in vertical direction is allowed, a supplementary plate member 27 is mounted on the pivot shaft 21 between the side panel 12 and the support 24. The supplementary plate member 27 has two raised portions 271 corresponding to the slots 122 of the side panel 12. When rotated the bracket 1 to let the two raised portions 271 be received in the slots 122, the user immediately senses the condition, and at this time, rotation of the second pivot set 3 in vertical direction is allowed. The supplementary plate member 27 has a recess 272 for accommodating the limiter 26. Further, a washer 28 is mounted on the pivot shaft 21 and supported between the support 24 and the fastening member 25, having a plurality of oil grooves 281 for receiving lubricating oil and supporting the load.

The hollow pivot shaft 31 of the second pivot set 3 is inserted vertically upwardly from the bottom side of the bracket 1 in proper order through at least one spring member 32, a locating member 33, the axle hole 111 of the horizontal top panel 11 of the bracket 1, a stop member 34 and a follower member 35, and then riveted to a through hole 361 of a mounting frame 36. As illustrated, the hollow pivot shaft 31 has at least one flat surface 311 on the periphery, allowing synchronous rotation of the locating member 33, the follower member 35 and the mounting frame 36 with the hollow pivot shaft 31. The hollow pivot shaft 31 has a head 313 at one end, a collar 315 extending around the periphery, and a neck 312 connected between the head 313 and the collar 315. The head 313 has two flat cut faces 314 for stopping the elongated ribs 212 of the head 211 of the pivot shaft 21. The collar 315 has two flat cut faces 316 for stopping the elongated ribs 212 of the head 211 of the pivot shaft 21.

The locating member 33 has two protrusions 331 corresponding to the horizontal grooves 112 of the horizontal top panel 11 of the bracket 1. When the locating member 33 is rotated with the hollow pivot shaft 31 to the angle where the two protrusions 331 are respectively aimed at the horizontal grooves 112 of the horizontal top panel 11 of the bracket 1, the two protrusions 331 are respectively forced into the horizontal grooves 112 by the spring power of the at least one spring member 32. Further, the stop member 34 has a sector stop flange 341. The follower member 35 has two downward push rods 351. During rotation of the follower member 35, one push rod 351 is forced against one end of the sector stop flange 341, thereby causing rotation of the stop member 34 with the follower member 35. The rotary motion is stopped, when the other end of the sector stop flange 341 touches one stop rod 113 of the bracket 1. On the contrary, when the follower member 35 is rotated in the reversed direction, the other push rod 351 will be forced against the other end sector stop flange 341, thereby causing rotation of the stop member 34 with the follower member 35, and the rotary motion will be stopped when the sector stop flange 341 touches the other stop rod 113 of the bracket 1. Further, a washer 37 may be respectively mounted on the hollow pivot shaft 31 between the collar 315 and the spring member 32 and between the follower member 35 and the mounting frame 36. Further, the spring member 32 can be a coil spring, corrugated spring plate, or spring washer.

The third pivot set 4 has a pivot shaft 41 inserted in proper order through a pivot hole 131 on the side panel 13 of the bracket 1, a ring 42 and a through hole 431 of a L-shaped support 43, and then riveted to the L-shaped support 43 with a locating ring 46, allowing rotation of the third pivot set 4 in the through hole 431 relative to the bracket 1.

Figure 3:
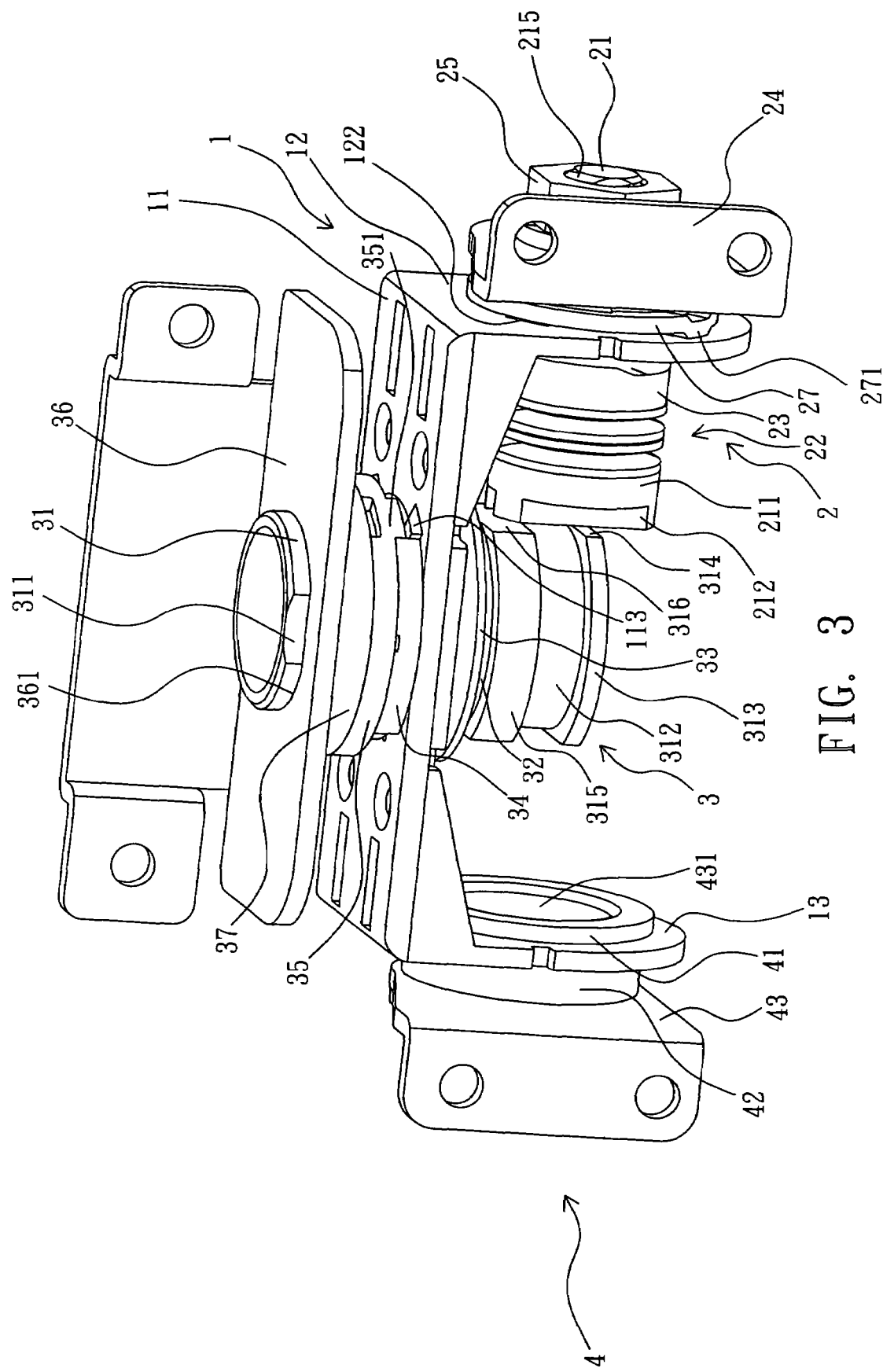
FIG. 3 is an elevational assembly view of the hinge structure according to the present invention.
Figure 4:
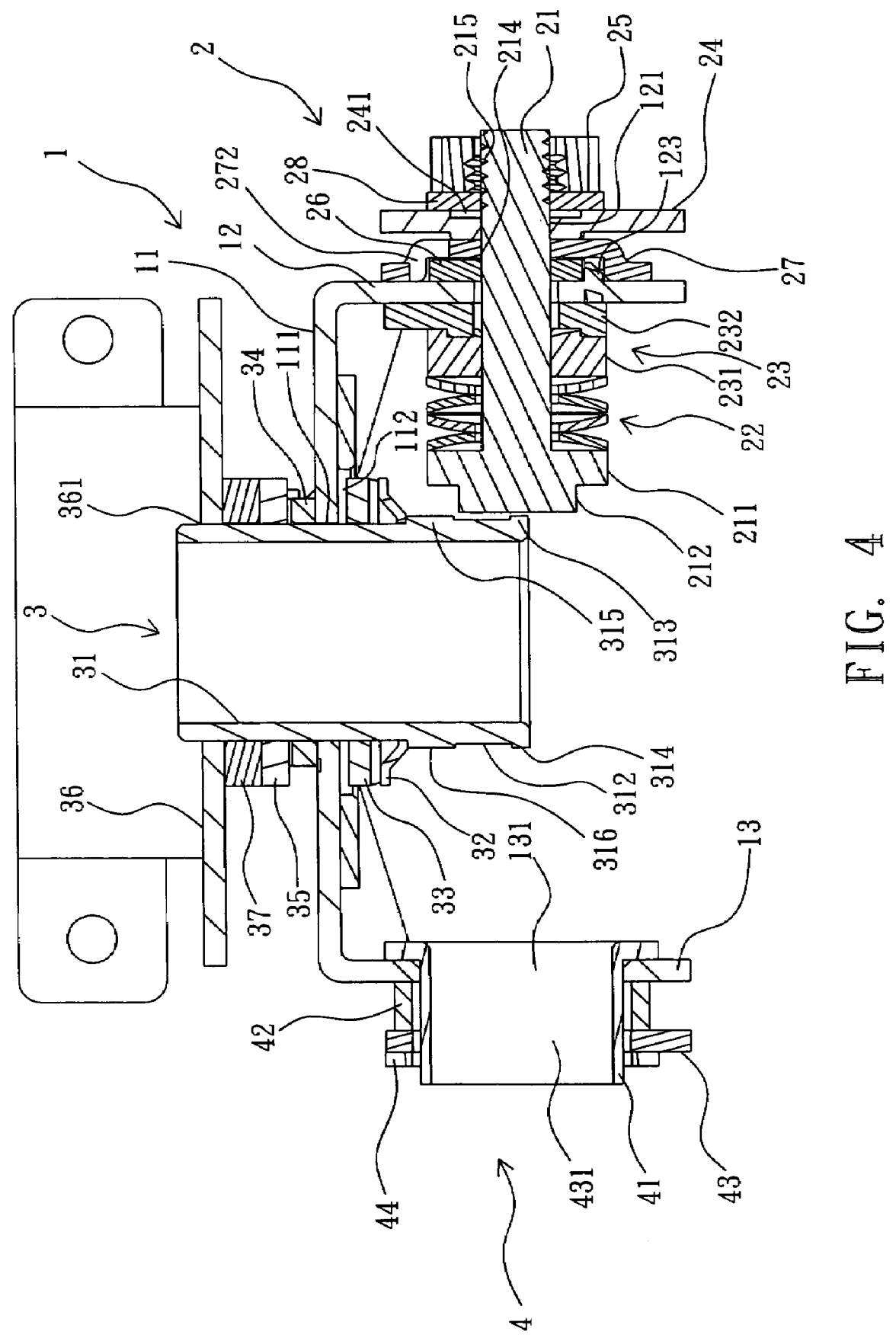
Figure 5:
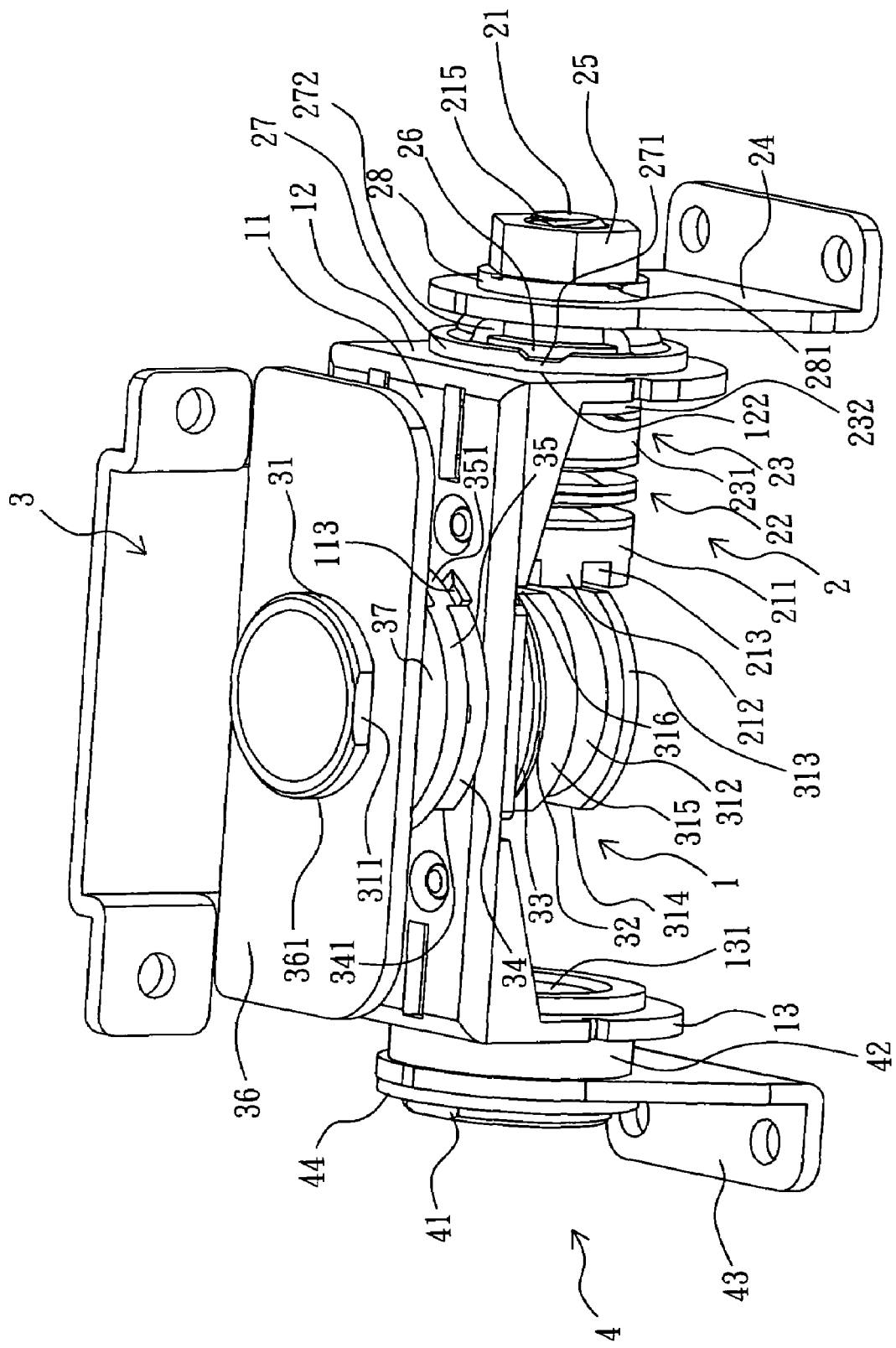
FIG. 5 illustrates the first pivot set rotated to the predetermined angle and the second pivot set unlocked according to the present invention.

During application, the two support members 24 and 43 and the mounting frame 36 are respectively fixedly fastened to the base member and cover of an electronic device, for example, a mobile computer (not shown). When the electronic device is closed (0° angle), as shown in FIGS. 3 and 4, the two elongated ribs 212 are respectively stopped at the flat cut faces 314 and 316, prohibiting rotation of the second pivot set 3. When opening the cover of the electronic device, the mounting frame 36 and the bracket 1 are turned with the cover of the electronic device relative to the base member and the supports 24 and 43. When the bracket 1 is turned relative to the supports 24 and 43 to a predetermined angle (90°), the two raised portions 271 of the supplementary plate member 27 are respectively moved into the slots 122 of the side panel 12, as shown in FIG. 5, at this time, the head 313 is received in the guide groove 213 between the two elongated ribs 212, i.e., the second pivot set 3 is unlocked and rotatable relative to the bracket 1. The angle of rotation of the hollow pivot shaft 31 of the second pivot set 3 is controlled by means of the follower member 35, the stop member 34 and the two stop rods 113. According to this embodiment, the angle of rotation of the second pivot set 3 is limited to 180°. By means of the application of the present invention, the cover of the electronic device is openable relative to the base member in horizontal direction and rotatable in vertical direction when the cover is opened to a predetermined angle.

As indicated above, the invention allows turning of the first pivot set with the bracket in horizontal direction, and unlocks the second pivot set for allowing rotation of the bracket with the second pivot set when the bracket is turned with the first pivot set to a predetermined angle. Further, the series connection structural design of the pivot sets greatly reduces the dimensions of the hinge structure for practical use in different 3C electronic products. Further, angle constraint means is respectively provided between the first and second pivot sets and the bracket to limit the turning angle of the first pivot set and the angle of rotation of the second pivot set. Further, the cam wheel set of the first pivot set provides the first pivot set with a self-locking function. This self-locking function is now seen in similar conventional designs.

A prototype of hinge structure has been constructed with the features of FIGS. 1~5. The hinge structure functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What is the claimed is:

1. A hinge structure comprising:
    a bracket having a horizontal top panel and a side panel perpendicularly downwardly extending from one end of said horizontal top panel;
    a first pivot set movable between a first position and a second position, said first pivot set having a pivot shaft horizontally and rotatably inserted through said side panel of said bracket and rotatably coupled to a support, the pivot shaft of said first pivot set having two elongated ribs protruded from one end thereof and a guide groove located between said two elongated ribs; and
    a second pivot set movable between a locked position and an unlocked position, said second pivot set having a pivot shaft vertically and rotatably inserted through the horizontal top panel of said bracket and rotatably coupled to a mounting frame, the pivot shaft of said second pivot set having a head at a bottom end thereof, the head of the pivot shaft of said second pivot set having two flat cut faces disposed at two opposite sides; and
    wherein, when said first pivot set is rotated relative to said bracket to a zero angle position, said first pivot set is located in the first position and said second pivot set is located in the locked position, the two elongated ribs of the pivot shaft of said first pivot set are positioned adjacent to at least one flat cut face of the two flat cut faces of the head of the pivot shaft of said second pivot set to lock said second pivot set, prohibiting rotation of said second pivot set;
    wherein, when said first pivot set is rotated relative to said bracket to a predetermined angle, said first pivot set is located in the second position and said second pivot set is located in the unlocked position, the head of the pivot shaft of said second pivot set is rotatable in the guide groove between the two elongated ribs of the pivot shaft of said first pivot set to unlock said second pivot set, allowing rotation of said second pivot set.

2. The hinge structure as claimed in claim 1, wherein said horizontal top panel of said bracket has a vertical axle hole; said side panel of said bracket has a pivot hole; the pivot shaft of said first pivot set is inserted through at least one spring member of said first pivot set and the pivot hole of the side panel of said bracket and then pivotally fastened a through hole of said support; the pivot shaft of said second pivot set is inserted through at least one spring member of said second pivot set and the axle hole of said horizontal top panel of said bracket and then pivotally fastened to a through hole of said mounting frame.

3. The hinge structure as claimed in claim 1, further comprising a third pivot set pivoted to said bracket, said third pivot set comprising a pivot shaft, a ring and a L-shaped support, the pivot shaft of said third pivot set being inserted through a pivot hole on a second side panel of said bracket and said ring and pivotally fastened to a through hole of said L-shaped support.

4. The hinge structure as claimed in claim 1, wherein the pivot shaft of said second pivot set has a collar and a neck connected between the collar and the head, said collar having two flat cut faces disposed at two opposite sides for stopping the two elongated ribs of the pivot shaft of said first pivot set.

5. The hinge structure as claimed in claim 1, wherein the horizontal top panel of said bracket has two horizontal grooves formed on a bottom wall thereof and respectively extending from said axle hole at two sides and aligned in line; said second pivot set further comprises a locating member mounted on the pivot shaft of said second pivot set below said horizontal top panel of said bracket, said locating member having two protrusions adapted to engage the horizontal grooves of the horizontal top panel of said bracket.

6. The hinge structure as claimed in claim 1, wherein said horizontal top panel of said bracket has two stop rods upwardly protruded from a top wall thereof around said axle hole and adapted to limit the angle of rotation of said second pivot set relative to said bracket; said second pivot set further comprises a stop member and a follower member respectively mounted on the pivot shaft of said second pivot set between said bracket and said mounting frame and rotatable with the pivot shaft of said second pivot set, said stop member having a sector stop flange, said follower member having two downward push rods; when said follower member is rotated with the pivot shaft of said second pivot set, one of said push rods is forced against said sector stop flange to move said stop member to a position where said sector stop flange is stopped stop rod of said bracket.

7. A hinge structure comprising:
   a bracket, said bracket having a horizontal top panel and a side panel perpendicularly downwardly extending from one end of said horizontal top panel;
   a first pivot set, said first pivot set comprising a pivot shaft horizontally and rotatably inserted through said side panel of said bracket and rotatably coupled to a support, the pivot shaft of said first pivot set having two elongated ribs protruded from one end thereof and a guide groove defined between said two elongated ribs; and
   a second pivot set, said second pivot set comprising a pivot shaft vertically and rotatably inserted through the horizontal top panel of said bracket and rotatably coupled to a mounting frame, the pivot shaft of said second pivot set having a head at a bottom end thereof, the head of the pivot shaft of said second pivot set having two flat cut faces disposed at two opposite sides; and
   wherein when said first pivot set is rotated relative to said bracket to a zero angle position, the two elongated ribs of the pivot shaft of said first pivot set are stopped at one flat cut face of the head of the pivot shaft of said second pivot set to lock said second pivot set, prohibiting rotation of said second pivot set; when said first pivot set is rotated relative to said bracket to a predetermined angle, the head of the pivot shaft of said second pivot set is received in the guide groove between the two elongated ribs of the pivot shaft of said first pivot set to unlock said second pivot set, allowing rotation of said second pivot set,
   wherein said side panel of said bracket has two slots; said first pivot set further comprises a supplementary plate member mounted on the pivot shaft of said first pivot set, said supplementary plate member having two raised portions corresponding to the slots of said side panel of said bracket; said raised portions of said supplementary plate member are respectively engaged into the slots of said side panel of said bracket when said first pivot set is rotated to said predetermined angle.

8. The hinge structure as claimed in claim 1, wherein said side panel of said bracket has a stop rod; said first pivot set further comprises a limiter mounted on the pivot shaft of said first pivot set between said side panel of said bracket and said support, said limiter having two protrusions spaced from each other at an angle and alternatively stoppable against the stop rod of said side panel of said bracket to limit the angle of rotation of said first pivot set relative to said bracket.

9. The hinge structure as claimed in claim 7, wherein said supplementary plate member has a recess adapted to accommodate a limiter that is mounted on the pivot shaft of said first pivot set and adapted to limit the angle of rotation of said first pivot set relative to said bracket.

10. The hinge structure as claimed in claim 1, wherein said first pivot set further comprises a cam wheel set, said cam wheel set comprising a movable member mounted on and rotatable with the pivot shaft of said first pivot set, and a fixed member affixed to said side panel of said bracket and disposed in contact with said movable member by means of a concave portion and a convex portion therebetween.

11. The hinge structure as claimed in claim 1,
   wherein said side panel of said bracket has two slots; said first pivot set further comprises a supplementary plate member mounted on the pivot shaft of said first pivot set, said supplementary plate member having two raised portions corresponding to the slots of said side panel of said bracket; said raised portions of said supplementary plate member are respectively engaged into the slots of said side panel of said bracket when said first pivot set is rotated to said predetermined angle.

12. The hinge structure as claimed in claim 11, wherein said supplementary plate member has a recess adapted to accommodate a limiter that is mounted on the pivot shaft of said first pivot set and adapted to limit the angle of rotation of said first pivot set relative to said bracket.

* * * * *